(12) United States Patent
Takaki (10) Patent No.: US 12,361,723 B2
(45) Date of Patent: Jul. 15, 2025

(54) OBJECT RECOGNITION DEVICE

(71) Applicant: DENSO CORPORATION, Kariya (JP)

(72) Inventor: Masanari Takaki, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 398 days.

(21) Appl. No.: 17/929,477

(22) Filed: Sep. 2, 2022

(65) Prior Publication Data

US 2022/0415058 A1 Dec. 29, 2022

Related U.S. Application Data

(63) Continuation of application No. PCT/JP2021/008176, filed on Mar. 3, 2021.

(30) Foreign Application Priority Data

Mar. 6, 2020 (JP) .................................. 2020-039161

(51) Int. Cl.
*G06V 20/58* (2022.01)
*G01S 17/931* (2020.01)
*G06V 10/20* (2022.01)
*G06V 10/25* (2022.01)

(52) U.S. Cl.
CPC .............. *G06V 20/58* (2022.01); *G06V 10/25* (2022.01); *G06V 10/255* (2022.01)

(58) Field of Classification Search
CPC ...... G06V 20/58; G06V 10/25; G06V 10/255; G01S 17/931
USPC ....................................................... 382/103
See application file for complete search history.

(56) References Cited

U.S. PATENT DOCUMENTS

2022/0358717 A1* 11/2022 Wang ...................... G06T 19/00

FOREIGN PATENT DOCUMENTS

| JP | 2001-080437 A | 3/2001 |
| JP | 2012-173230 A | 9/2012 |

OTHER PUBLICATIONS

Tobias Nyström Johansson et al. "LiDAR Clustering and Shape Extraction for Automotive Applications", 2017, Chalmers University of Technology (Year: 2017).*
Liat Sless et al. "Road Scene Understanding by Occupancy Grid Learning from Sparse Radar Clusters using Semantic Segmentation", 2019, Computer Vision Foundation (Year: 2019).*

* cited by examiner

*Primary Examiner* — Chineyere Wills-Burns
*Assistant Examiner* — Lucius Cameron Green Allen
(74) *Attorney, Agent, or Firm* — Maschoff Brennan (57) ABSTRACT

An object recognition device to be mounted to a vehicle includes a cluster point group formation unit and an object recognition unit. The cluster point group formation unit is configured to form a cluster point group by executing clustering for a plurality of reflecting points. The object recognition unit recognizes the cluster point group as an object. The object recognition unit is configured to, in response to determining that an outer shape of an upper surface that is an outer shape of the recognized object viewed from the top has a concave section when viewed from a vehicle side, divide the cluster point group into a plurality of quasi-cluster point groups based on a position of the concave section and recognizes each of the plurality of quasi-cluster point groups as an object.

10 Claims, 7 Drawing Sheets

OBJECT RECOGNITION DEVICE

CROSS-REFERENCE TO RELATED APPLICATION

The present application is a continuation application of International Application No. PCT/JP2021/008176, filed on Mar. 3, 2021, which claims priority to Japanese Patent Application No. 2020-39161 filed on Mar. 6, 2020. The contents of these applications are incorporated herein by reference in their entirety.

BACKGROUND

Technical Field

The present disclosure relates to an object recognition device.

Background Art

An object recognition device that forms a cluster point group by executing clustering for a plurality of reflecting points detected by receiving reflected waves of radiated electromagnetic waves and recognizes the formed cluster point group as an object is known.

In such an object recognition device, for example, in a case where a plurality of objects exist close to each other, there is a case where one cluster point group is formed from reflecting points due to the plurality of objects. In this case, the plurality of objects are erroneously recognized as one object.

SUMMARY

In the present disclosure, provided is an object recognition device as the following.

The object recognition device to be mounted to a vehicle includes a cluster point group formation unit and an object recognition unit. The object recognition unit is configured to, in response to determining that an outer shape of an upper surface that is an outer shape of recognized object viewed from the top has a concave section when viewed from a vehicle side, divide a cluster point group into a plurality of quasi-cluster point groups based on a position of the concave section and recognizes each of the plurality of quasi-cluster point groups as an object.

DETAILED DESCRIPTION OF THE PREFERRED EMBODIMENTS

For example, PTL 1 proposes an object recognition device configured to determine that a plurality of objects are erroneously recognized as one object in a case where at least one of a width or a length of the recognized object increases beyond a predetermined determination value.

[PTL 1] JP 2001-80437 A

However, as a result of detailed examination by the inventor, a problem has been found that the object recognition device disclosed in PTL 1 cannot perform the above-described determination only with a recognition result at a certain time point because the object recognition device performs the above-described determination using a change amount over time of a width or a length of the recognized object.

One aspect of the present disclosure provides an object recognition device capable of determining that a plurality of objects are erroneously recognized as one object only with a recognition result at a certain time point.

One aspect of the present disclosure is an object recognition device to be mounted to a vehicle and including a cluster point group formation unit and an object recognition unit. The cluster point group formation unit forms a cluster point group by executing clustering for a plurality of reflecting points specified by radiating transmission waves in a plurality of irradiation directions and receiving reflected waves of the transmission waves. The object recognition unit recognizes the cluster point group as an object. Further, the object recognition unit is configured to: extract a plurality of reflecting points of interest from a plurality of outer edge reflecting points located at an outer edge on the vehicle side viewed from the top in the cluster point group at an extraction ratio based on a distance between the vehicle and the cluster point group; determine whether an outer shape of an upper surface that is an outer shape of the recognized object viewed from a top has a concave section when viewed from the vehicle side, using the plurality of reflecting points of interest, and in response to determining that the outer shape of the upper surface has the concave section, divide the cluster point group into a plurality of quasi-cluster point groups based on a position of the concave section and recognize each of the plurality of quasi-cluster point groups as an object, and the extraction ratio is smaller as the distance between the vehicle and the cluster point group is shorter.

According to such a configuration, it is possible to determine that a plurality of objects are erroneously recognized as one object only with a recognition result at a certain time point.

An illustrative embodiment of the present disclosure will be described below with reference to the drawings.

1. Configuration

Figure 1:
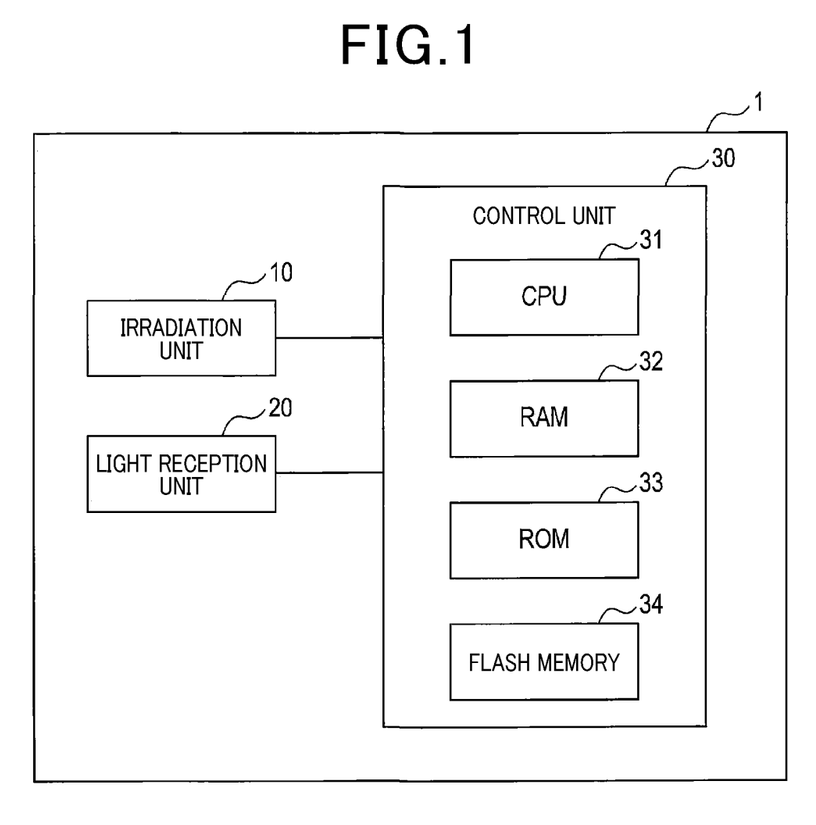
FIG. 1 is a block diagram illustrating a configuration of a lidar device.

A lidar device 1 illustrated in FIG. 1 is an object recognition device that recognizes an object by radiating laser light and receiving reflected light of the laser light. The lidar device 1 is, for example, mounted to a vehicle and used to recognize various objects existing around the vehicle. Hereinafter, a vehicle to which the lidar device 1 is mounted will be also referred to as an own vehicle. Note that the lidar is also expressed as LIDAR. LIDAR is an abbreviation of light detection and ranging.

As illustrated in FIG. 1, the lidar device 1 includes an irradiation unit 10, a light reception unit 20 and a control unit 30.

The irradiation unit 10 irradiates an irradiation area determined in advance with laser light based on an instruction from the control unit 30. The irradiation area is an area expanding in a predetermined angular range respectively in a horizontal direction and in a vertical direction ahead of the vehicle. The irradiation unit 10 irradiates an entire area of the irradiation area by respectively irradiating with laser light, H×V irradiation sections obtained by sectioning the horizontal direction of the irradiation area in H orientations and sectioning the vertical direction in V orientations. Both H and V are integers equal to or greater than 1. Hereinafter, for each irradiation section, an orientation in the horizontal direction will be also referred to as a horizontal orientation, and an orientation in the vertical direction will be also referred to as a vertical orientation. In the present embodiment, numbers from 1 to H are sequentially assigned to the horizontal orientations from the left, and numbers from 1 to V are sequentially assigned to the vertical orientations from the top in the irradiation area.

The light reception unit 20 receives reflected light of the laser light radiated by the irradiation unit 10. Further, the light reception unit 20 converts the received reflected light into an electrical signal and outputs the electrical signal to the control unit 30.

The control unit 30 is mainly constituted with a well-known microcomputer including a CPU 31, a RAM 32, a ROM 33 and a flash memory 34. Functions of the control unit 30 are implemented by the CPU 31 executing a program stored in a non-transitory tangible recording medium. In this example, the ROM 33 corresponds to the non-transitory tangible recording medium. Further, a method corresponding to the program is executed by the program being executed. Note that the control unit 30 may include one microcomputer or may include a plurality of microcomputers.

2. Processing

Figure 2:
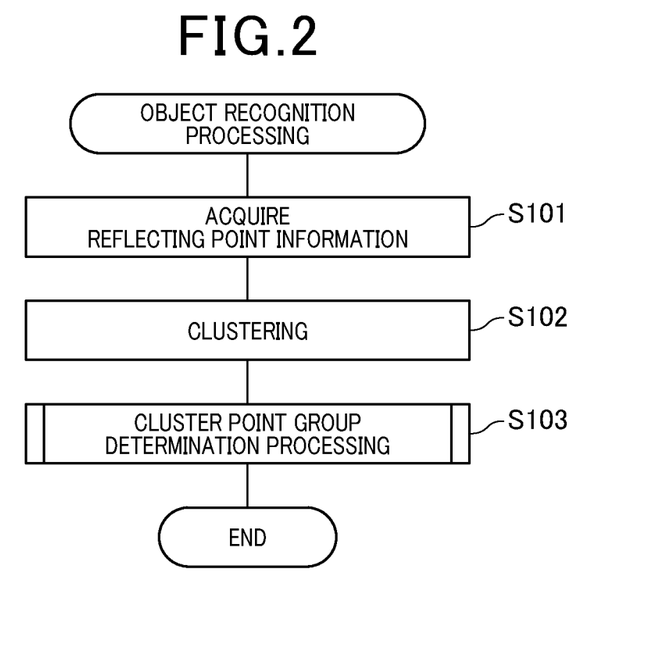
FIG. 2 is a flowchart of object recognition processing.

Object recognition processing to be executed by the CPU 31 of the control unit 30 will be described next using a flowchart indicated in FIG. 2. The CPU 31 starts the object recognition processing by being triggered by end of scanning with laser light corresponding to one cycle. End of scanning with laser light corresponding to one cycle indicates that irradiation of the entire area of the irradiation area with laser light by the irradiation unit 10 is completed.

First, in S101, the CPU 31 acquires reflecting point information. The reflecting point information includes information indicating three-dimensional positions of reflecting points that are points at which the laser light is reflected. The three-dimensional positions of the reflecting points can be specified from the horizontal orientation and the vertical orientation of irradiation sections of laser light related to the reflecting points and distances from the lidar device 1. The CPU 31 acquires reflecting point information concerning all the reflecting points obtained through scanning with laser light corresponding to one cycle in S101.

Subsequently, in S102, the CPU 31 forms a cluster point group by executing clustering for all the reflecting points based on the reflecting point information acquired in S101 and recognizes the formed cluster point group as an object.

Subsequently, in S103, the CPU 31 executes cluster point group determination processing. The cluster point group determination processing is processing of determining whether a plurality of objects are erroneously recognized as one object. Specifically, the CPU 31 determines whether an outer shape of an upper surface that is an outer shape of the object viewed from the top has a concave section when viewed from the own vehicle side assuming that the object recognized in S102 is a vehicle. It can be considered that the vehicle has an outer shape of a box viewed from the top in a broad view. Thus, if the recognized object is assumed to be a vehicle, in a case where one cluster point group is formed from reflecting points by one object in S102, it can be considered that the outer shape of the upper surface does not have a concave section. Thus, in a case where it is determined that the outer shape of the upper surface has a concave section, the CPU 31 determines in S102 that one cluster point group is formed from reflecting points by a plurality of objects, that is, a plurality of objects are erroneously recognized as one object. Then, the CPU 31 divides the cluster point group related to the object into a plurality of quasi-cluster point groups and recognizes each of the quasi-cluster point groups as an object. Note that the cluster point group determination processing will be described in further detail later.

When the processing in S103 ends, the CPU 31 ends the object recognition processing.

Figure 5:
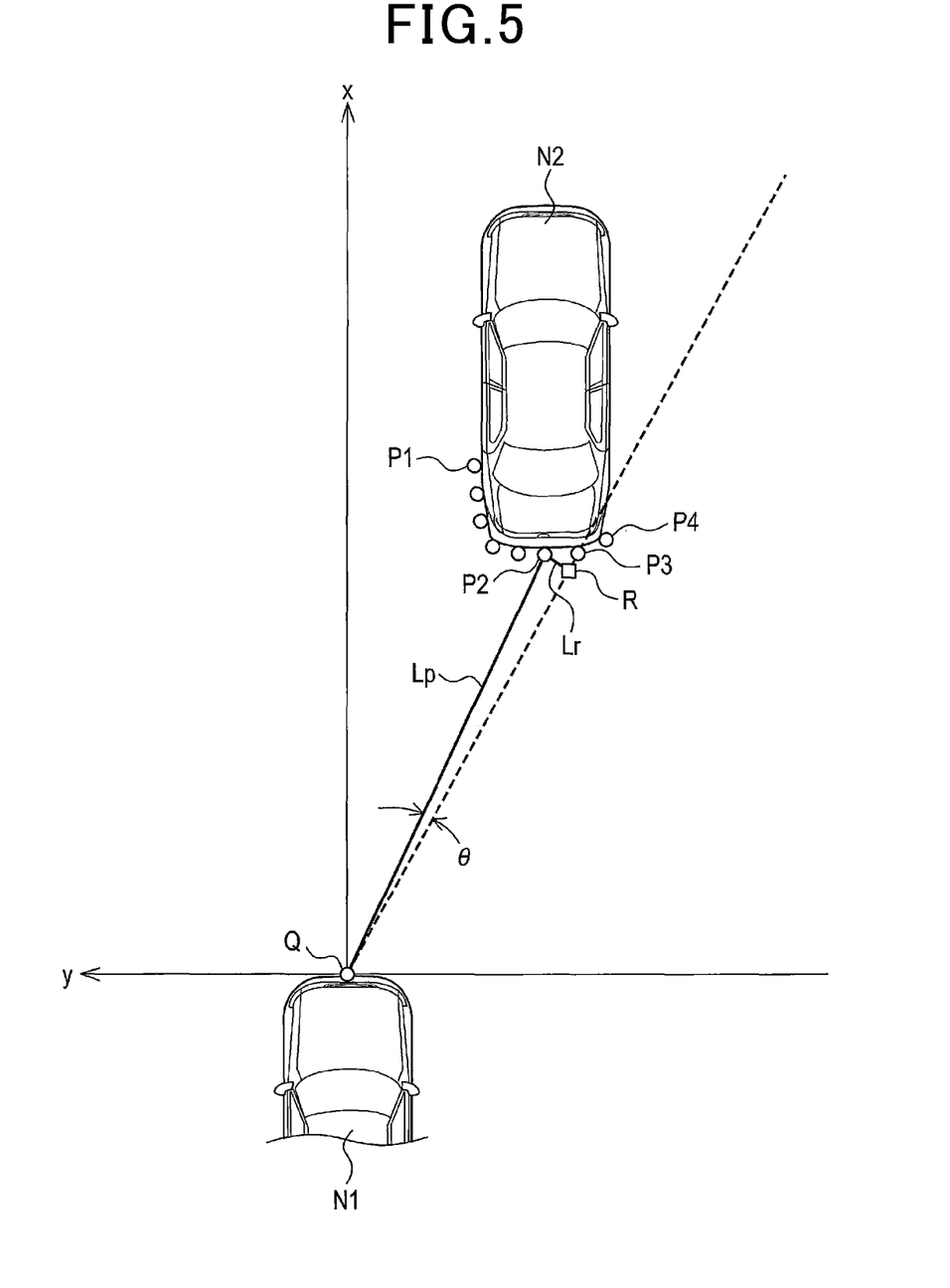
FIG. 5 is a schematic diagram illustrating an example of a plurality of outer edge reflecting points projected on an XY plane in the cluster point group determination processing.
Figure 6:
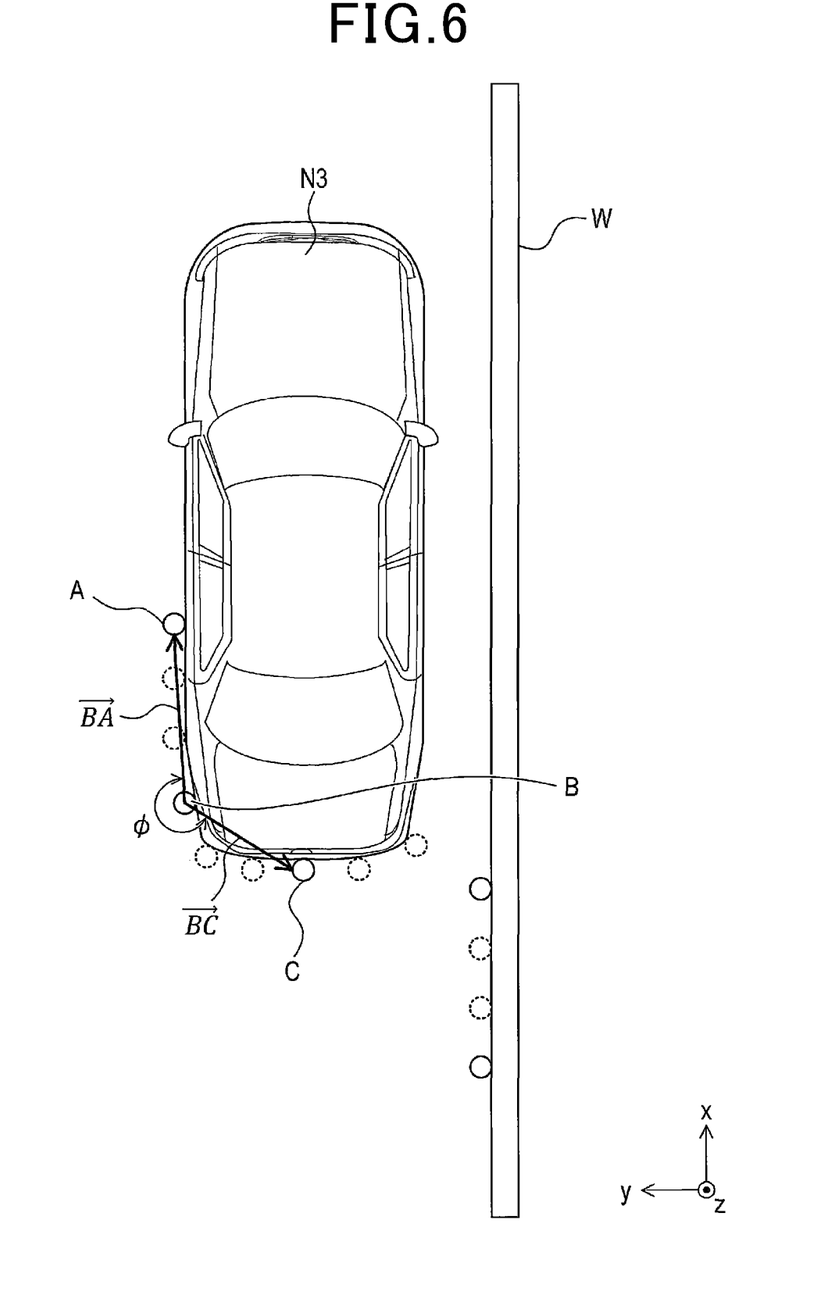
FIG. 6 is a schematic diagram illustrating an example when an outer shape angle is determined in the cluster point group determination processing.
Figure 7:
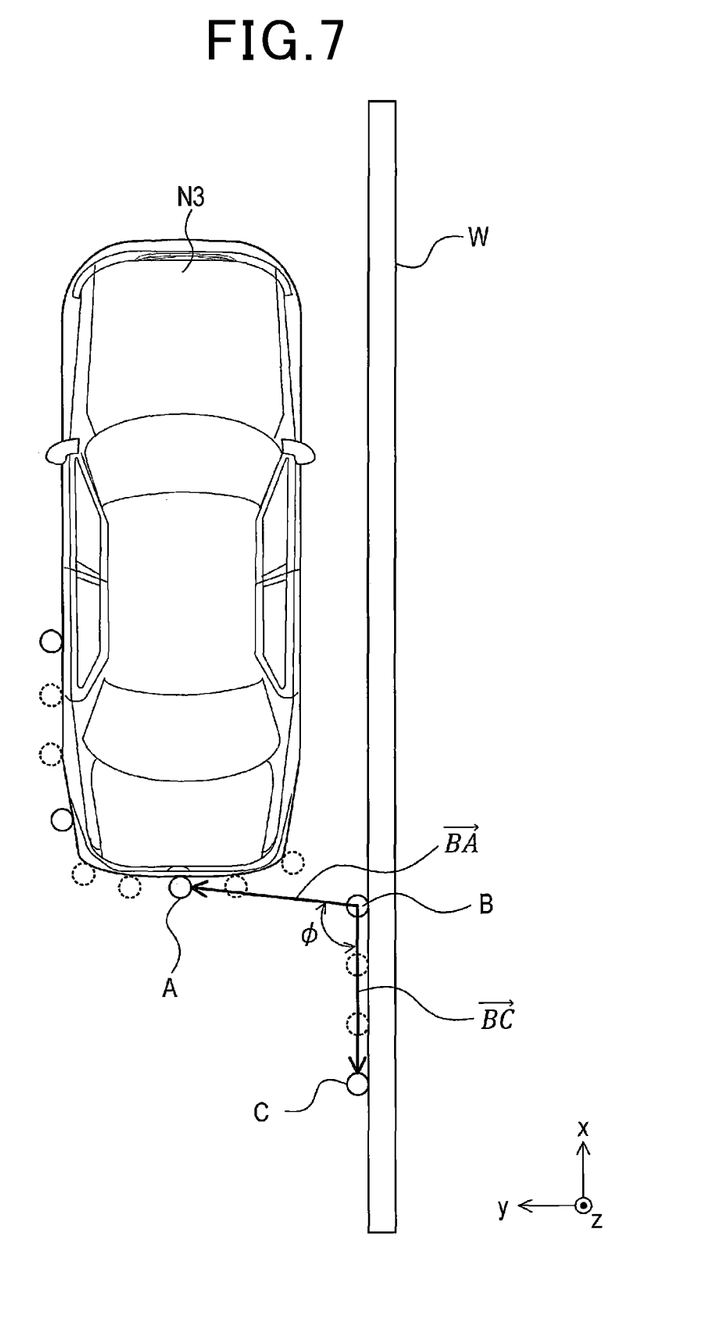
FIG. 7 is a schematic diagram illustrating another example when the outer shape angle is determined in the cluster point group determination processing.

The cluster point group determination processing in the object recognition processing will be described next using the flowchart indicated in FIG. 3 and schematic diagrams illustrated in FIG. 5 to FIG. 7.

First, in S201 indicated in FIG. 3, the CPU 31 performs processing from S202 to S211 which will be described later for all objects recognized in S102 and determines whether determination as to whether the outer shape of the upper surface has a concave section ends. In a case where it is determined in S201 that determination as to whether the outer shape of the upper surface has a concave section ends for all the objects, the CPU 31 ends the cluster point group determination processing.

On the other hand, in a case where the CPU 31 determines in S201 that determination as to whether the outer shape of the upper surface has a concave section does not end for all the objects, that is, there is an object for which determination as to whether the outer shape of the upper surface has a concave section has not ended yet, the processing transitions to S202.

In S202, the CPU 31 selects one object for which determination as to whether the outer shape of the upper surface has a concave section has not ended yet among the objects recognized in S102 and determines whether the object is an object related to a quasi-cluster point group.

In a case where the CPU 31 determines in S202 that the selected object is an object related to a quasi-cluster point group, the processing returns to S201. As described above, the quasi-cluster point group is a point group obtained by dividing the cluster point group in the object recognition processing. In other words, it is determined whether the outer shape of the upper surface has a concave section in an object related to the cluster point group before division for the object related to the quasi-cluster point group. Thus, in the present embodiment, the processing returns to S201 in the above-described case in terms of processing load at the CPU 31.

On the other hand, in a case where the CPU 31 determines in S202 that the selected object is an object that is not determined as an object related to a quasi-cluster point group, that is, an object related to the cluster point group that is not divided, the processing transitions to S203.

In S203, the CPU 31 first views the object selected in S202 from the top and projects the cluster point group related to the object on a two-dimensional plane. In the present embodiment, as illustrated in FIG. 5, the two-dimensional plane is an XY plane with an origin of a reference point Q determined in advance at the lidar device 1 mounted to a vehicle N1 corresponding to the own vehicle. On the XY plane, a positive direction on an X axis is a traveling direction of the vehicle N1, and a positive direction on a Y axis is a leftward direction with respect to the traveling direction of the vehicle N1. Further, an orientation of each reflecting point on the XY plane is the same as a horizontal orientation in three-dimensional space before projection. The same numbers as the numbers in the corresponding horizontal orientations, that is, numbers 1 to H sequentially from left when viewed from the vehicle N1 side are assigned to the respective orientations on the XY plane. Note that in FIG. 5, a vehicle N2 corresponds to the object related to the cluster point group.

Then, the CPU 31 extracts outer edge reflecting points from the cluster point group projected on the two-dimensional plane. The outer edge reflecting points are reflecting points located at an outer edge of an object viewed from the top among a plurality of reflecting points belonging to the cluster group. In other words, reflecting points closest to the own vehicle among a plurality of reflecting points with the same orientation on the XY plane are the outer edge reflecting points. On the XY plane, the plurality of reflecting points with the same orientation are located on the same line that passes through the origin. The reflecting point closest to the origin among the plurality of reflecting points located on the line corresponds to the outer edge reflecting point. Normally, the cluster point group includes a plurality of reflecting points with orientations on the XY plane different from each other, and thus, in S203, an outer edge reflecting point is extracted for each orientation. In other words, a plurality of outer edge reflecting points are extracted. FIG. 5 illustrates a plurality of reflecting points extracted in S203 as a solid circle.

Subsequently, in S204 indicated in FIG. 3, the CPU 31 sets a start orientation and a termination orientation for the plurality of outer edge reflecting points extracted in S203. Specifically, orientations respectively related to two outer edge reflecting points located at both ends when viewed from the own vehicle side among the plurality of outer edge reflecting points on the XY plane are set as the start orientation and the termination orientation. In the example illustrated in FIG. 5, an orientation Hmin of an outer edge reflecting point P1 located at a left end when viewed from the vehicle N1 side on the XY plane among the plurality of outer edge reflecting points is set as the start orientation. Further, an orientation Hmax of an outer edge reflecting point P4 located at a right end when viewed from the vehicle N1 side on the XY plane among the plurality of outer edge reflecting points is set as the termination orientation.

Subsequently, in S205 indicated in FIG. 3, the CPU 31 sets an orientation interval for the plurality of outer edge reflecting points extracted in S203. As will be described later, the orientation interval is a parameter to be used to extract a plurality of reflecting points of interest from the plurality of outer edge reflecting points. As the orientation interval is greater, less reflecting points of interest are extracted with respect to the number of outer edge reflecting points. In other words, as the orientation interval is greater, a ratio of the number of reflecting points of interest with respect to the number of outer edge reflecting points becomes smaller. Hereinafter, the ratio of the number of reflecting points of interest with respect to the number of outer edge reflecting points will be also referred to as an extraction ratio.

As will be described in detail later, the CPU 31 determines whether the outer shape of the upper surface has a concave section using the extracted plurality of reflecting points of interest. In other words, the CPU 31 determines whether the outer shape of the upper surface specified by the plurality of reflecting points of interest has a concave section. The concave section in the present determination, for example, means a relatively large concave section in the outer shape of the upper surface in which a boundary between objects adjacent to each other is reflected. Thus, small irregularities of the outer shape of the object viewed from the top are preferably not reflected in the outer shape of the upper surface specified by the plurality of reflecting points of interest. If such small irregularities are reflected in the outer shape of the upper surface, even in a case where one cluster point group is formed from reflecting points of one object in S102, there is a possibility that it is determined that the outer shape of the upper surface has a concave section, and it is erroneously determined that a plurality of objects are erroneously recognized as one object.

If a distance between reflecting points of interest adjacent to each other (hereinafter, also referred to as a distance between points of interest) is too short in the extracted plurality of reflecting points of interest, small irregularities of the outer shape of the object viewed from the top are reflected in the outer shape of the upper surface. On the other hand, if the distance between points of interest is too long, there is a possibility that the outer shape of the object viewed from the top is not appropriately reflected in the outer shape of the upper surface. Thus, the reflecting points of interest that are adjacent to each other are preferably moderately far from each other. Hereinafter, a targeted distance between points of interest will be also referred to as a target distance.

Here, a distance between outer edge reflecting points that are adjacent to each other (hereinafter, also referred to as a distance between outer edge points) in the plurality of outer edge reflecting points is different depending on a distance between the own vehicle and the cluster point group to which the outer edge reflecting points belong. As the distance between the own vehicle and the cluster point group is shorter, the distance between outer edge points is shorter. To make the distance between points of interest closer to the target distance regardless of the distance between the own vehicle and the cluster point group, the CPU 31 needs to make the extraction ratio smaller as the distance between the own vehicle and the cluster point group is shorter. Thus, the CPU 31 sets the orientation interval based on the distance between the own vehicle and the cluster point group in S205.

In the present embodiment, the CPU 31 first calculates a distance between the own vehicle and the cluster point group to set the orientation interval. Specifically, as illustrated in FIG. 5, the CPU 31 calculates a distance between a reference point Q of the lidar device 1 and one point P2 in the cluster point group as a distance between the vehicle N1 corresponding to the own vehicle and the cluster point group. The point P2 is an outer edge reflecting point for which an X component of the two-dimensional coordinate is the smallest on the XY plane among the plurality of outer edge reflecting points belonging to the cluster point group. A two-dimensional coordinate (X, Y) of the point P2 is expressed as (Xp, Yp). As described above, the point Q is the origin on the XY plane, and thus, the two-dimensional coordinate of the point Q is expressed as (0, 0). The CPU 31 calculates a distance between the vehicle N1 and the cluster point group, that is, a length Lp of a line segment connecting the point Q and the point P2 using expression 1.

[Math. 1]

$$L_p = \sqrt{y_p^2 + x_p^2} \qquad \text{(expression 1)}$$

The CPU 31 then calculates a distance between the outer edge points. In the example illustrated in FIG. 5, a length Lr of a line segment connecting the point P2 and a point R is calculated as the distance between the outer edge points. In FIG. 5, a reflecting point related to an orientation shifted rightward from the point P2 on the XY plane by one orientation when viewed from the vehicle N1 is indicated as a point P3. Further, a line passing through the point Q and the point P3 is indicated with a dashed line. The point R is a point located on the line and away from the point Q by a distance that is the same as the distance between the point Q and the point P2. In other words, the CPU 31 calculates a length Lr of a base of an isosceles triangle in which a length of equal sides is Lp and a vertex angle is an angle θ corresponding to one orientation on the XY plane, as the distance between outer edge points. The length Lr is calculated using expression 2. Note that in FIG. 5, the point R is indicated as a square.

[Maty. 2]

$$L_r = 2 \times L_p \times \sin\left(\frac{\theta}{2}\right) \qquad \text{(expression 2)}$$

Then, the CPU 31 calculates an orientation interval using expression 3. In expression 3, the orientation interval is expressed as a variable ΔH. Further, a variable D in expression 3 is the target distance described above. The orientation interval is calculated as an integer by truncation (deleting the fractional part).

[Math. 3]

$$\Delta H = \frac{D}{L_r} \qquad \text{(expression 3)}$$

Subsequently, in S206 indicated in FIG. 3, the CPU 31 extracts three reflecting points of interest from the plurality of outer edge reflecting points using the orientation interval set in S205. Hereinafter, the three reflecting points of interest will be respectively referred to a reflecting point of interest A, a reflecting point of interest B and a reflecting point of interest C. In the present embodiment, the CPU 31 extracts an outer edge reflecting point for which the orientation on the XY plane is Hmin extracted as the start orientation, as the reflecting point of interest A. Further, the CPU 31 extracts outer edge reflecting points for which the orientations on the XY plane are respectively Hmin+ΔH and Hmin+ΔH×2, as the reflecting point of interest B and the reflecting point of interest C.

Subsequently, in S207, the CPU 31 determines whether the orientation of the reflecting point of interest located rightmost when viewed from the own vehicle side among the three reflecting points of interest on the XY plane, that is, the orientation of the reflecting point of interest C is greater than the termination orientation.

In a case where the CPU 31 determines in S207 that the orientation of the reflecting point of interest C on the XY plane is greater than the termination orientation, the processing transitions to shape determination processing in S211 which will be described in detail later. Then, when the CPU 31 ends the processing in S211 ends, the processing returns to S201.

On the other hand, in a case where the CPU 31 determines in S207 that the orientation of the reflecting point of interest C on the XY plane is equal to or less than the termination orientation, the processing transitions to S208.

In S208, the CPU 31 determines whether an outer shape angle specified by the three reflecting points of interest is smaller than 180°. The outer shape angle refers to an angle facing the own vehicle in the outer shape of the upper surface. In other words, the outer shape angle specified by the three reflecting points of interest refers to an angle which faces the own vehicle in the outer shape of the upper surface and which is specified by two lines respectively connecting from the reflecting point of interest B to the reflecting point of interest A and the reflecting point of interest C. Specifically, as illustrated in FIG. 6 and FIG. 7, the CPU 31 determines whether the outer shape angle is smaller than 180° based on an outer product of a BA vector connecting from the reflecting point of interest B to the reflecting point of interest A and a BC vector connecting from the reflecting point of interest B to the reflecting point of interest C. Note that FIG. 6 and FIG. 7 indicate a magnitude of the outer shape angle with an angle φ.

The outer product of the BA vector and the BC vector becomes a vector perpendicular to the XY plane. In other words, in a right-handed coordinate system having a Z axis which is perpendicular to the XY plane and which passes through the origin on the XY plane, a three-dimensional coordinate (X, Y, Z) of the outer product becomes (0, 0, Zb). Further, the outer product, for example, becomes a vector extending in a negative direction on the Z axis starting from the reflecting point of interest B located on the XY plane if the angle φ is greater than 180° as illustrated in FIG. 6. In other words, a Z component Zb of the three-dimensional coordinate of the outer product becomes a negative value. Further, if the angle φ is 180°, the outer product becomes a zero vector. In other words, Zb becomes 0. Further, for example, as illustrated in FIG. 7, if the angle φ is smaller than 180°, the outer product becomes a vector extending in a positive direction on the Z axis starting from the reflecting point of interest B. In other words, Zb becomes a positive value. Thus, the CPU 31 determines whether the outer shape angle is smaller than 180° by determining whether the Z component Zb of the outer product is a positive value in S208. Note that FIG. 6 and FIG. 7 indicate a plurality of outer edge reflecting points as solid circles or dashed circles. Among these, a plurality of outer edge reflecting points indicated as solid circles correspond to the extracted plurality of reflecting points of interest. Further, an object related to the plurality of outer edge reflecting points is indicated as a vehicle N3 and a wall surface W. In other words, FIG. 6 and FIG. 7 illustrate an example where one cluster point group is formed from reflecting points of two objects.

Figure 3:
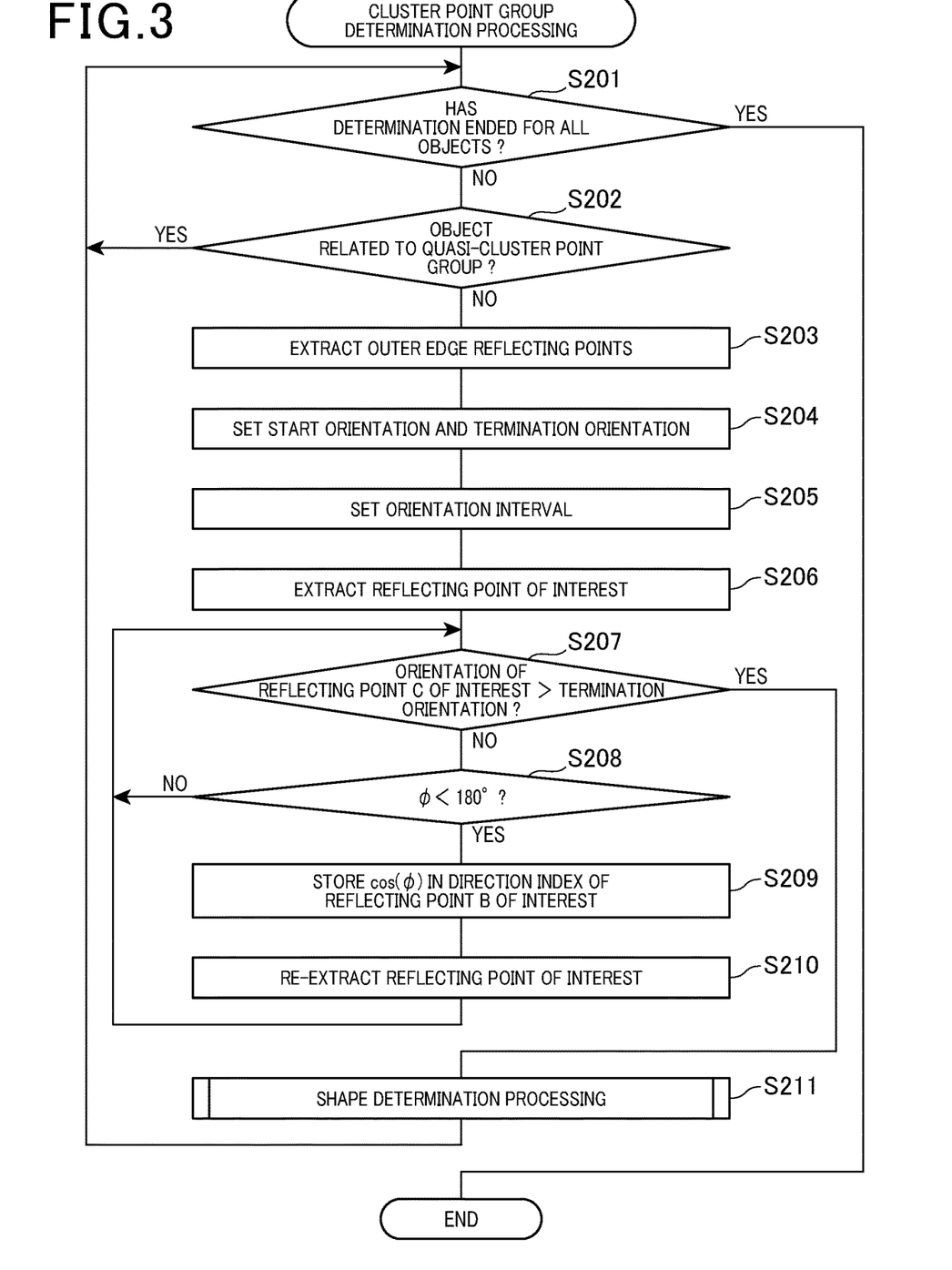
FIG. 3 is a flowchart of cluster point group determination processing in the object recognition processing.

In a case where the CPU 31 determines that the Z component Zb of the above-described outer product is a positive value in S208 indicated in FIG. 3 and determines that the outer shape angle is smaller than 180°, the processing transitions to S209.

In S209, the CPU 31 calculates a cosine value of the outer shape angle from an inner product of the BA vector and the BC vector and stores the cosine value in a flash memory 34 as a direction index of the reflecting point of interest B. In the example illustrated in FIG. 7, a value of cos(φ) is stored as the direction index of the reflecting point of interest B.

Subsequently, in S210 indicated in FIG. 3, the CPU 31 re-extracts three reflecting points of interest from the plurality of outer edge reflecting points. Specifically, the CPU 31 re-extracts the outer edge reflecting point extracted as the reflecting point of interest B as the reflecting point of interest A and re-extracts the outer edge reflecting point extracted as the reflecting point of interest C as the reflecting point of interest B. Then, the CPU 31 extracts an outer edge reflecting point for which an orientation on the XY plane is greater than that of the outer edge reflecting point that is re-extracted as the reflecting point of interest B by an amount corresponding to the orientation interval, as the reflecting point of interest C.

In a case where the processing in S210 ends or in a case where it is determined in S208 that the Z component Zb of the outer product described above is 0 or a negative value and it is determined that the outer shape angle is equal to or greater than 180°, the processing of the CPU 31 returns to S207.

Figure 4:
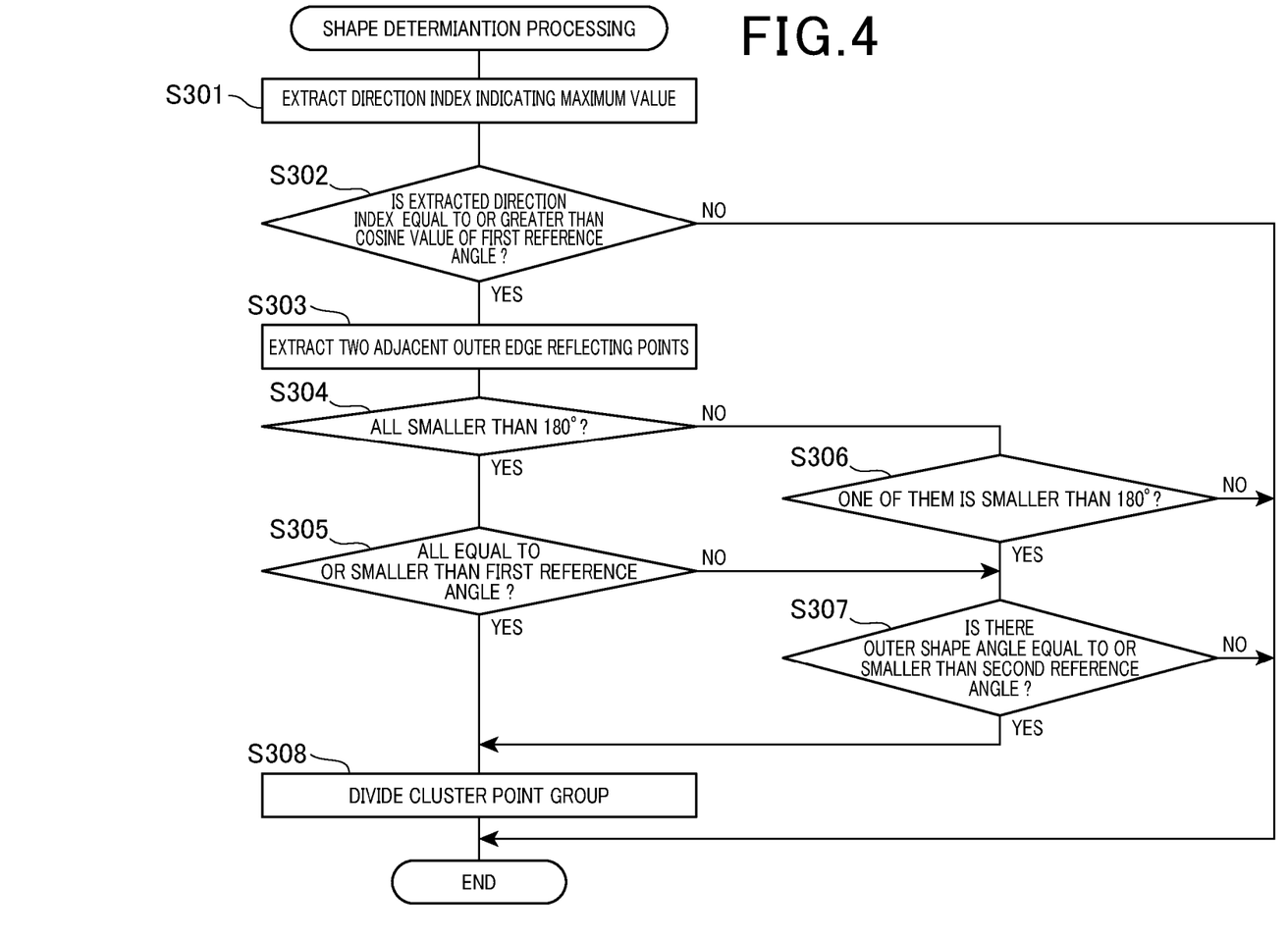
FIG. 4 is a flowchart of shape determination processing in the cluster point group determination processing.

The shape determination processing in the cluster point group determination processing will be described next using the flowchart indicated in FIG. 4.

First, in S301, the CPU 31 extracts a direction index indicating a maximum value, that is, indicating a minimum outer shape angle among direction indexes stored in S209.

Subsequently, in S302, the CPU 31 determines whether the direction index extracted in S301 is equal to or greater than a cosine value of a first reference angle. The first reference angle is an angle smaller than 180° determined in advance. In other words, the CPU 31 determines in S302 whether the outer shape indicated by the direction index extracted in S301 is equal to or smaller than the first reference angle. In a case where it is determined in S302 that the direction index extracted in S301 is equal to or greater than the cosine value of the first reference angle, the processing of the CPU 31 transitions to S303.

In S303, the CPU 31 extracts two outer edge reflecting points adjacent to the reflecting point of interest related to the direction index extracted in S301. In the present embodiment, the CPU 31 extracts an outer edge reflecting point for which an orientation on the XY plane is smaller by one orientation and an outer edge reflecting point for which an orientation on the XY plane is greater by one orientation than that of the reflecting point of interest, as the two outer edge reflecting points adjacent to the reflecting point of interest related to the direction index extracted in S301.

Subsequently, in S304, the CPU 31 determines whether both the outer shape angles for the two outer edge reflecting points extracted in S303 are smaller than 180°. The outer shape angle for the outer edge reflecting point is an outer shape angle specified by three points of the outer edge reflecting point, an outer edge reflecting point for which an orientation on the XY plane is smaller than that of the outer edge reflecting point by the orientation interval, and an outer edge reflecting point for which an orientation on the XY plane is grater than that of the outer edge reflecting point by the orientation interval. Whether the outer shape angle is smaller than 180° can be determined in a similar manner to the processing in S208 described above.

In a case where it is determined in S304 that both the outer shape angles of the two outer edge reflecting points extracted in S303 are smaller than 180°, the processing of the CPU 31 transitions to S305.

In S305, the CPU 31 determines whether both the outer shape angles of the two outer edge reflecting points extracted in S303 are equal to or smaller than the first reference angle. Specifically, the CPU 31 calculates a cosine value of the outer shape angle for each of the two outer edge reflecting points extracted in S303. Then, by determining whether both the two calculated cosine values are equal to or greater than a cosine value of the first reference angle, the CPU 31 determines whether both the outer shape angles are equal to or smaller than the first reference angle. The cosine value of the outer shape angle can be calculated in a similar manner to the processing in S209 described above.

On the other hand, in a case where it is determined in S304 that at least one of the outer shape angles of the two outer edge reflecting points extracted in S303 is equal to or greater than 180°, the processing of the CPU 31 transitions to S306.

In S306, the CPU 31 determines whether one of the outer shape angles of the two outer edge reflecting points extracted in S303 is smaller than 180°.

In a case where it is determined in S306 that one of the outer shape angles of the two outer edge reflecting points extracted in S303 is smaller than 180°, the processing of the CPU 31 transitions to S307. Also in a case where it is determined in S305 that at least one of the outer shape angles of the two outer edge reflecting points extracted in S303 is greater than the first reference angle, the processing of the CPU 31 transitions to S307.

In S307, it is determined whether there is an outer shape angle equal to or smaller than a second reference angle for outer shape angles that are determined in S304 or S306 as being smaller than 180°. The second reference angle is an angle smaller than 180°, determined in advance. The second reference angle may be set to an angle smaller than the first reference angle. Note that whether the outer shape angle is equal to or smaller than the second reference angle can be determined in a similar manner to the processing in S305 described above.

In a case where it is determined in S307 that there is an outer shape angle equal to or smaller than the second reference angle, the processing of the CPU 31 transitions to S308. Also in a case where it is determined in S305 that both the outer shape angles of the two outer edge reflecting points extracted in S303 are equal to or smaller than the first reference angle, the processing of the CPU 31 transitions to S308.

In S308, the CPU 31 determines that the outer shape of the upper surface of the object related to the cluster point group has a concave section and divides the cluster point group into two quasi-cluster point groups along an orientation on the XY plane of the reflecting point of interest related to the direction index indicating a maximum value, extracted in S301. Then, the CPU 31 recognizes each of the two quasi-cluster point groups as an object.

If the processing in S308 ends, the CPU 31 ends the shape determination processing. Also in a case where it is determined in S302 that the direction index extracted in S301 is smaller than the cosine value of the first reference angle, the CPU 31 ends the shape determination processing. Also in a case where it is determined in S306 that both the outer shape angles of the two outer edge reflecting points extracted in S303 are equal to or greater than 180°, the CPU 31 ends the shape determination processing. Also in a case where it is determined in S307 that there is no outer shape angle equal to or smaller than the second reference angle, the CPU 31 ends the shape determination processing.

3. Effects

According to the embodiment described in detail above, the following effects can be obtained.

(3a) The lidar device 1 is configured to recognize a cluster point group as an object. Further, in a case where it is determined that an outer shape of an upper surface has a concave section when viewed from an own vehicle side, the lidar device 1 is configured to divide the cluster point group into a plurality of quasi-cluster point groups based on a position of the concave section and recognize each of the plurality of quasi-cluster point groups as an object.

According to such a configuration, it is possible to determine that a plurality of objects are erroneously recognized as one object only with a recognition result at a certain time point.

(3b) The lidar device 1 is configured to extract a plurality of reflecting points of interest from a plurality of outer edge reflecting points at an extraction ratio based on a distance between an own vehicle and a cluster point group and determine whether an outer shape of an upper surface has a concave section using the plurality of reflecting points of interest. The extraction ratio is smaller as the distance between the own vehicle and the cluster point group is shorter.

According to such a configuration, the lidar device 1 can prevent erroneous determination that the outer shape of the upper surface has a concave section.

(3c) The lidar device 1 is configured to determine that the outer shape of the upper surface has the concave section, in response to an outer shape angle being equal to or smaller than a reference angle that is smaller than 180°, the outer shape angle being an angle facing the vehicle in the outer shape of the upper surface and being specified by three reflecting points of interest adjacent to one another among the plurality of reflecting points of interest.

According to such a configuration, the lidar device 1 can prevent erroneous determination that the outer shape of the upper surface has a concave section.

(3d) The outer shape angle serves as a first outer shape angle, and the lidar device 1 is configured to determine that the outer shape of the upper surface has the concave section, in response to a second outer shape angle adjacent to the first outer shape angle being equal to or smaller than the reference angle, the second outer shape angle being an angle facing the vehicle in the outer shape of the upper surface and being specified by three reflecting points of interest adjacent to one another among the plurality of reflecting points of interest.

According to such a configuration, for example, also in a case where an error occurs between a three-dimensional position indicated by reflecting point information and an actual three-dimensional position for the reflecting point, or in a case where small irregularities of the outer shape of the object viewed from the top are reflected in the outer shape of the upper surface, the lidar device 1 can appropriately determine whether the outer shape of the upper surface has a concave section.

(3e) The lidar device 1 is configured to obtain an inner product of two vectors respectively connecting from one point located at the center to the other two points among three reflecting points of interest adjacent to one another among a plurality of reflecting points of interest in a case where it is determined that an outer shape angle specified by the three reflecting points of interest is smaller than 180° based on an outer product of the two vectors. Further, the lidar device 1 is configured to determine whether the outer shape angle specified by the above-described three reflecting points of interest is equal to or smaller than the reference angle based on the inner product.

According to such a configuration, the lidar device 1 does not have to determine whether the outer shape angle is equal to or smaller than the reference angle in a case where it is determined that the outer shape angle is equal to or greater than 180°, so that it is possible to reduce processing load.

4. Other Embodiments

While the embodiment of the present disclosure has been described above, it goes without saying that the present disclosure is not limited to the above-described embodiment and can adopt various forms.

(4a) In the above-described embodiment, an outer edge reflecting point for which an X component of a two-dimensional coordinate on the XY plane is the smallest among a plurality of outer edge reflecting points belonging to a cluster point group is employed as one point in the cluster point group to calculate a distance between the own vehicle and the cluster point group. However, one point in the cluster point group is not limited to this. The one point in the cluster point group may be, for example, any reflecting point belonging to the cluster point group, may be a center point of some reflecting points selected from a plurality of reflecting points belonging to the cluster point group or may be a center point of all the reflecting points.

(4b) While in the above-described embodiment, an orientation interval is calculated using expression 1 to expression 3 to set the orientation interval, a setting method of the orientation interval is not limited to this. For example, a table indicating a relationship between a distance and an orientation interval may be stored in advance in the flash memory 34, the distance being between an own vehicle and a cluster point group, and the orientation interval may be set with reference to the table using a distance between the own vehicle and the cluster point group calculated using expression 1.

(4c) In the above-described embodiment, in a case where an outer shape angle specified by three reflecting points of interest is smaller than 180°, the CPU 31 determines whether an outer shape of an upper surface has a concave section by performing shape determination processing. However, the CPU 31 may determine whether an outer shape of an upper surface has a concave section without performing the shape determination processing.

(4d) In the above-described embodiment, in a case where an outer shape angle specified by three reflecting points of interest is equal to or smaller than a first reference angle, the CPU 31 determines an outer shape angle for two adjacent outer edge reflecting points and determines whether an outer shape of an upper surface has a concave section. However, the CPU 31 may determine that an outer shape of an upper surface has a concave section without performing determination of an outer shape angle for adjacent outer edge reflecting points.

(4e) In the above-described embodiment, the CPU 31 extracts an outer edge reflecting point for which an orientation on the XY plane is smaller or greater than that of the reflecting point of interest by one orientation as an outer edge reflecting point adjacent to the reflecting point of interest related to a direction index indicating a maximum value. However, the CPU 31 may extract an outer edge reflecting point for which an orientation on the XY plane is smaller or greater by two orientations, for example, small or greater by an amount corresponding to an orientation interval.

(4f) While in the above-described embodiment, the CPU 31 divides one cluster point group into two quasi-cluster point groups, for example, one cluster point group may be divided into three or more quasi-cluster point groups. For example, in a case where objects related to the quasi-cluster point groups are made targets of object recognition processing, if the quasi-cluster point groups are further divided, the original cluster point group is divided into three or more quasi-cluster point groups.

(4g) Functions of one component in the above-described embodiment may be distributed to a plurality of components, or functions of a plurality of components may be integrated into one component. Further, part of the components of the above-described embodiment may be omitted. Further, at least part of the components of the above-described embodiment may be added, replaced, or the like, with respect to the other components of the above-described embodiment.

Note that in the above-described embodiment, the processing in S102 corresponds to processing as a cluster point group formation unit, and the processing in S103 corresponds to processing as an object recognition unit.

What is claimed is:

1. An object recognition device configured to be mounted to a vehicle, the object recognition device comprising:
   a processor;
   a non-transitory computer-readable storage medium; and
   a set of computer-executable instructions stored on the non-transitory computer-readable storage medium that cause the processor to:
   form a cluster point group by executing clustering for a plurality of reflecting points specified by radiating transmission waves in a plurality of irradiation directions and receiving reflected waves of the transmission waves; and
   recognize the cluster point group as an object,
   wherein the set of computer-executable instructions further cause the processor to:
   extract a plurality of reflecting points of interest from a plurality of outer edge reflecting points located at an outer edge on the vehicle side viewed from the top in the cluster point group at an extraction ratio based on a distance between the vehicle and the cluster point group;
   determine whether an outer shape of an upper surface that is an outer shape of the recognized object viewed from a top has a concave section when viewed from the vehicle side, using the plurality of reflecting points of interest, and
   in response to determining that the outer shape of the upper surface has the concave section, divide the cluster point group into a plurality of quasi-cluster point groups based on a position of the concave section and recognize each of the plurality of quasi-cluster point groups as an object, and
   the extraction ratio is smaller as the distance between the vehicle and the cluster point group is shorter.

2. The object recognition device according to claim 1, wherein the set of computer-executable instructions further cause the processor to
   determine that the outer shape of the upper surface has the concave section, in response to an outer shape angle being equal to or smaller than a reference angle that is smaller than 180°, the outer shape angle being an angle facing the vehicle in the outer shape of the upper surface and being specified by three reflecting points of interest adjacent to one another among the plurality of reflecting points of interest.

3. The object recognition device according to claim 2, wherein
   the outer shape angle serves as a first outer shape angle, and
   wherein the set of computer-executable instructions further cause the processor to
   determine that the outer shape of the upper surface has the concave section, in response to a second outer shape angle adjacent to the first outer shape angle being equal to or smaller than the reference angle, the second outer shape angle being an angle facing the vehicle in the outer shape of the upper surface and being specified by three reflecting points of interest adjacent to one another among the plurality of reflecting points of interest.

4. The object recognition device according to claim 2, wherein the set of computer-executable instructions further cause the processor to
   obtain an inner product of two vectors respectively connecting one point located at a center to the other two points in the three reflecting points of interest, in response to determining that the outer shape angle specified by the three reflecting points of interest being smaller than 180° based on an outer product of the two vectors, and
   determine whether the outer shape angle specified by the three reflecting points of interest is equal to or smaller than the reference angle based on of the inner product.

5. The object recognition device according to claim 3, wherein the set of computer-executable instructions further cause the processor to
   obtain an inner product of two vectors respectively connecting one point located at a center to the other two points in the three reflecting points of interest, in response to determining that the outer shape angle specified by the three reflecting points of interest being smaller than 180° based on an outer product of the two vectors, and
   determine whether the outer shape angle specified by the three reflecting points of interest is equal to or smaller than the reference angle based on of the inner product.

6. A method for performing object recognition by a vehicle comprising:
   forming a cluster point group by executing clustering for a plurality of reflecting points specified by radiating transmission waves in a plurality of irradiation directions and receiving reflected waves of the transmission waves; and
   recognizing the cluster point group as an object, by
      extracting a plurality of reflecting points of interest from a plurality of outer edge reflecting points located at an outer edge on the vehicle side viewed from the top in the cluster point group at an extraction ratio based on a distance between the vehicle and the cluster point group;
      determining whether an outer shape of an upper surface that is an outer shape of the recognized object viewed from a top has a concave section when viewed from the vehicle side, using the plurality of reflecting points of interest, and
      in response to determining that the outer shape of the upper surface has the concave section, dividing the cluster point group into a plurality of quasi-cluster point groups based on a position of the concave section and recognizing each of the plurality of quasi-cluster point groups as an object, wherein the extraction ratio is smaller as the distance between the vehicle and the cluster point group is shorter.

7. The method according to claim 6, further comprising determining that the outer shape of the upper surface has the concave section, in response to an outer shape angle being equal to or smaller than a reference angle that is smaller than 180°, the outer shape angle being an angle facing the vehicle in the outer shape of the upper surface and being specified by three reflecting points of interest adjacent to one another among the plurality of reflecting points of interest.

8. The method according to claim 7, wherein the outer shape angle serves as a first outer shape angle, and wherein the method further comprises determining that the outer shape of the upper surface has the concave section, in response to a second outer shape angle adjacent to the first outer shape angle being equal to or smaller than the reference angle, the second outer shape angle being an angle facing the vehicle in the outer shape of the upper surface and being specified by three reflecting points of interest adjacent to one another among the plurality of reflecting points of interest.

9. The method according to claim 7, further comprising:

obtaining an inner product of two vectors respectively connecting one point located at a center to the other two points in the three reflecting points of interest, in response to determining that the outer shape angle specified by the three reflecting points of interest being smaller than 180° based on an outer product of the two vectors; and determining whether the outer shape angle specified by the three reflecting points of interest is equal to or smaller than the reference angle based on of the inner product.

10. The method according to claim 8, further comprising:

obtaining an inner product of two vectors respectively connecting one point located at a center to the other two points in the three reflecting points of interest, in response to determining that the outer shape angle specified by the three reflecting points of interest being smaller than 180° based on an outer product of the two vectors; and determining whether the outer shape angle specified by the three reflecting points of interest is equal to or smaller than the reference angle based on of the inner product.

* * * * *